United States Patent [19]
Selwitz

[11] 3,728,409

[45] Apr. 17, 1973

[54] PROCESS FOR MAKING POLYNUCLEAR AROMATIC COMPOUNDS

[75] Inventor: Charles M. Selwitz, Monroeville, Pa.

[73] Assignee: Gulf Research & Development Company, Pittsburgh, Pa.

[22] Filed: Nov. 5, 1970

[21] Appl. No.: 87,289

[52] U.S. Cl. ......260/668 C, 260/649 DP, 260/650 R, 260/670

[51] Int. Cl. ............................................. C07c 15/14

[58] Field of Search .................. 260/670, 668, 668 C, 260/649 DP, 650 R

[56] References Cited

UNITED STATES PATENTS

| | | | |
|---|---|---|---|
| 3,591,644 | 7/1971 | Notaro et al. | 260/649 DP |
| 3,591,645 | 7/1971 | Selwitz | 260/649 DP |
| 3,636,170 | 1/1972 | Notaro et al. | 260/649 DP |
| 3,644,543 | 2/1972 | Notaro et al. | 260/649 DP |
| 3,428,700 | 2/1969 | Cyba | 260/668 C |
| 3,401,207 | 9/1968 | Selwitz | 260/670 |
| 3,145,237 | 8/1964 | van Helden et al. | 260/670 |
| 3,481,997 | 12/1969 | Vanderwerff | 260/670 |

Primary Examiner—Curtis R. Davis
Attorney—Meyer Neishloss, Deane E. Keith and Joseph J. Carducci

[57] ABSTRACT

A process for the production of a polynuclear aromatic compound from an aromatic compound having a labile hydrogen atom attached to its nucleus which involves heating the latter aromatic compound with a noble metal salt of an organic acid in the presence of a strong acid and molecular oxygen in a reaction system free of halide ions and nitrate ions.

12 Claims, No Drawings

PROCESS FOR MAKING POLYNUCLEAR AROMATIC COMPOUNDS

This invention relates to a process for producing polynuclear aromatic compounds whose aromatic nuclei are directly linked to one another by nuclear carbon to nuclear carbon bond, particularly to a process for converting benzene or substituted benzenes to diphenyl or substituted diphenyls, respectively.

In my U.S. Pat. No. 3,401,207, dated Sept. 10, 1968 and assigned to the same assignee as the present application, I have disclosed and claimed a process which comprises treating an aromatic compound with itself or with another aromatic in a halide-free and a nitrate-free system in the presence of a strong acid catalyst and a noble metal salt of an organic acid, particularly a palladium salt of a carboxylic acid, under selected conditions and for a time sufficient to obtain polynuclear aromatic compounds. I have now found that the amount of polynuclear aromatic compound that can be produced in the process can be appreciably increased by carrying out the same in the additional presence of molecular oxygen.

Any aromatic compound containing one or more aromatic rings, or a mixture of such compounds, having a labile hydrogen attached to at least one carbon atom in the aromatic nucleus, can be employed herein. By "labile" I mean that the hydrogen possesses an electronic and steric enviromnent which permits its removal from the nucleus. Examples of such aromatic compounds that can be employed are aromatic compounds having from six to 74 carbon atoms, preferably from six to 24 carbon atoms, such as benzene, toluene, chlorobenzene, methyl benzoate, naphthalene, phenyl acetate, anisole, ortho xylene, cumene, $\alpha,\alpha$-dimethylbenzylsuccinic anhydride, diphenyl, benzoic acid, etc. These compounds when employed herein will form, for example, the following polynuclear aromatic compounds: biphenyl, bitolyl, p,p'-dichlorobiphenyl, dimethyl biphenyldicarboxylate, binaphthyls, dihydroxybiphenyl diacetate, dimethoxybiphenyl, 3,3',4,4''-dimethylbiphenyl, diisopropylbiphenyl, p,p'-di-(1,1-dimethylpropyl-2,3-dicarboxylic acid anhydride)biphenyl, tetraphenyl, biphenyl dicarboxylic acid, etc. Although the main product herein will be a dimer of the aromatic charge, lesser amounts of trimers and higher polymers will also be formed.

The metallic portion of the noble metal salts employed herein as catalysts include palladium, rhodium, iridium, osmium, ruthenium, and platinum. Palladium is the preferred metal. The anionic portion of the noble metal salt can be derived from organic acids, particularly carboxylic acids, having from one to 40 carbon atoms, preferably from two to 10 carbon atoms, such as formic, acetic, propionic, butyric, pivalic, octanoic, isooctanoic, benzoic, lauric, stearic, isobutyric, paratoluic, gamma-chlorobutyric, tetracontanoic, phenylacetic, cyclohexane carboxylic, crotonic furoic, heptanoic, eicosanoic, etc. The preferred carboxylic acid is acetic acid. Examples of such salts that can be employed herein include rhodium formate, palladium acetate, palladium propionate, iridium butyrate, palladium pivalate, palladium octanoate, osmium isooctanoate, palladium benzoate, palladium laurate, ruthenium stearate, palladium isobutyrate, palladium para-toluate, platinum gammachloro butyrate, ruthenium tetracontanoate, osmium phenylace-tate, iridium cyclohexane carboxylate, rhodium crotonate, palladium furoate, palladium heptanoate, palladium eicosanoate, etc. The preferred salt is palladium acetate.

The cocatalyst employed in the present reaction is a strong acid, that is, one having an ionization constant K at 25°C. of $10^{-3}$ or higher. Specific examples of acids that can thus be employed as catalysts include sulfuric, perchloric, phosphoric, trifluoroacetic, glycerophosphoric, iodic, periodic, pyrophosphoric, trichloroacetic, etc.

Preferably the reaction of the present process is carried out in a suitable liquid medium, for example, inert, highly polar compounds. Particularly suitable are carboxylic acids having from one to eight carbon atoms, preferably from two to five carbon atoms. Examples of such carboxylic acids that can be employed include formic, acetic, propionic, butyric, isobutyric, valeric, hexanoic, heptanoic, gamma chlorobutyric, octanoic, methoxyacetic, etc. Acetic acid is preferred. Other liquids that can be employed include ethers, amides, sulfoxides, ketones, such as meta dioxane, dimethylacetamide, dimethylformamide, dimethylsulfoxide, acetone, etc.

The amounts of aromatic compound and catalysts employed herein can be varied over wide limits. Thus, the mols of noble metal salts relative to the aromatic compound can be from about 1:6 to about 1:1000, preferably from about 1:20 to about 1:100. The amount of strong acid relative to the aromatic compound can be from about 1:3 to about 1:80, preferably from about 1:6 to about 1:12. The amount of liquid medium used need be only sufficient to facilitate contact among the components therein. For example, on a molar basis relative to the aromatic compound the ratios can be from about 1:1 to about 1000:1, preferably within the range of about 3:1 to about 50:1. The mols of oxygen provided per mol of aromatic compound can be from about 2:1 to about 1:20, preferably from about 1:2 to about 1:10. Temperatures employed in the reaction can be, for example, from about 60° to about 200° C., preferably in the range of about 80° to about 140° C., and the oxygen pressure can be, for example, from about 0.1 to about 1000 pounds per square inch gauge, preferably within the range of about 10 to about 1000 pounds per square inch gauge, most preferably from about 100 to about 500 pounds per square inch gauge. This pressure, with adequate stirring of the contents of the reaction mixture, will assure that sufficient oxygen will be present to obtain the results desired herein. Reaction time can also vary over a wide range, for example, from about 0.001 to about 100, preferably from about 0.1 to about 10 hours.

At the end of the reaction period the desired diphenyls can be recovered from the reaction mixture in any suitable manner. Thus, water can be added to the reaction mixture. At the bottom of the resultant produce there will be the noble metal, above it a layer containing liquid reaction medium, for example, acetic acid, water and the strong acid, and on top of it diphenyl and unreacted aromatic. The two liquid layers can be removed therefrom and separated from each other by any suitable means, for example, by decantation. The diphenyl can be removed from excess, unreacted aromatic compound by any suitable means, for example, by distillation. The water can be removed from the aqueous layer in any suitable manner, for example, by distillation, leaving behind the liquid reaction medium and strong acid.

The process can be further illustrated by the following, in which two series of runs were carried out. In one series there was placed in a glass flask an aromatic compound, a strong acid, a noble metal salt and acetic acid. The mixture was refluxed at atmospheric pressure. Refluxing assured that no appreciable amount of oxygen was present in the reaction system. In the second series of runs there was placed in a heavy glass flask equipped with a glass stirrer an aromatic compound, a strong acid, a noble metal salt and acetic acid. The mixture was pressured with oxygen and then brought to reaction temperature. The pressure was maintained by addition of oxygen during the run. The reaction products were analyzed by gas phase chromatography. Data obtained are summarized below in TABLE I.

labile hydrogen atom attached to the nucleus thereof which comprises contacting said latter aromatic compound with a noble metal salt of an organic acid in the presence of a strong acid and molecular oxygen in a reaction system free of halide ions and nitrate ions at a temperature above 60° C. but below 200° C..

2. The process of claim 1 wherein said latter aromatic compound is benzene.

3. The process of claim 1 wherein said latter aromatic compound is orthodichlorobenzene.

4. The process of claim 1 wherein said latter aromatic compound is orthoxylene.

5. The process of claim 1 wherein said noble metal salt is a palladium salt of an organic acid.

6. The process of claim 1 wherein said noble metal salt is a palladium salt of a carboxylic acid.

7. The process of claim 1 wherein said noble metal salt is palladium acetate.

TABLE I

| Run No. | Aromatic compound | Grams | Noble metal salt | Milli-mols | Strong acid | Milli-mols | Oxygen, milli-mols [1] | Acetic acid, milli-liters | Oxygen pressure, pounds per square inch gauge [2] | Temp., °C. | Time, hours | Compound obtained | Mols per mol of noble metal |
|---|---|---|---|---|---|---|---|---|---|---|---|---|---|
| 1 | Benzene | 6.7 | Palladium acetate | 5 | Sulfuric | 10 | None | 100 | None | 110 | 24 | Diphenyl / Terphenyl | 0.58 / 0.12 |
| 2 | do | 6.7 | do | 5 | Perchloric | 10 | None | 100 | None | 110 | 24 | Diphenyl / Terphenyl | 0.81 / 0.13 |
| 3 | do | 6.7 | Palladium cyanide | 2.5 | Sulfuric | 5 | None | 100 | None | 110 | 24 | Diphenyl | 0.54 |
| 4 | Toluene | 6.7 | Palladium acetate | 5 | Perchloric | 10 | None | 100 | None | 110 | 24 | Ditolyl | 0.80 |
| 5 | Benzene | 31.2 | do | 5 | Sulfuric | 70 | 64.9 | 150 | 170 | 135 | 3 | Diphenyl / Terphenyl | 14.1 / 4.3 |
| 6 | Orthodichlorobenzene | 60 | do | 10 | do | 70 | 57.6 | 150 | 170 | 150 | 3 | Tetrachlorodiphenyl | 14.5 |
| 7 | Orthoxylene | 170 | do | 44.5 | do | 280 | 273.0 | 450 | 140 | 120 | 5.2 | Tetramethyldiphenyl | 6.9 |

[1] Represents millimols of oxygen reacted as determined by pressure drop in system.
[2] In Runs 1, 2, 3 and 4, operation was under atmospheric pressure and under reflux; thus no oxygen was present.

The data in the above Table clearly show the advantages obtained by operating in accordance with the procedure disclosed and defined herein. In each of Runs Nos. 1, 2, 3 and 4, wherein the reaction was carried out at atmospheric pressure under reflux with no appreciable amount of molecular oxygen in the reaction mixture, a relatively small amount of diphenyl was obtained relative to the amount of noble metal salt used. In the remaining runs, however, wherein an oxygen pressure was maintained on the reaction system throughout the runs and stirring assured the presence of molecular oxygen throughout the reaction mixture, a significantly larger amount of diphenyls was obtained relative to the amount of noble metal salt used.

Obviously, many modifications and variations of the invention, as hereinabove set forth, can be made without departing from the spirit and scope thereof, and therefore only such limitations should be imposed as are indicated in the appended claims.

I claim:

1. A process for the production of a polynuclear aromatic compound from an aromatic compound having a labile hydrogen atom attached to the nucleus thereof which comprises contacting said latter aromatic compound with a noble metal salt of an organic acid in the presence of a strong acid and molecular oxygen in a reaction system free of halide ions and nitrate ions at a temperature above 60° C. but below 200° C..

8. The process of claim 1 wherein said strong acid is sulfuric acid.

9. The process of claim 1 wherein the reaction is carried out in an inert liquid medium.

10. The process of claim 1 wherein the reaction is carried out in acetic acid.

11. The process of claim 1 wherein the mols of said noble metal salt relative to said latter aromatic compound is in the range of about 1:6 to about 1:1000, the mols of said strong acid relative to said latter aromatic compound is in the range of about 1:3 to about 1:80, and the mols of oxygen per mol of said latter aromatic compound is in the range of about 2:1 to about 1:20.

12. The process of claim 1 wherein the mols of said noble metal salt relative to said latter aromatic compound is in the range of about 1:20 to about 1:100, the mols of said strong acid relative to said latter aromatic compound is in the range of about 1:6 to about 1:12, and the mols of oxygen per mol of said latter aromatic compound is in the range of about 1:2 to about 1:10.

* * * * *